(12) United States Patent
Saikawa et al.

(10) Patent No.: US 7,866,666 B2
(45) Date of Patent: Jan. 11, 2011

(54) PROCESSING DEVICE, CONTROL METHOD FOR A PROCESSING DEVICE, PROGRAM, PROCESSING SYSTEM AND CONTROL METHOD FOR A PROCESSING SYSTEM

(75) Inventors: Takashi Saikawa, Nagano-ken (JP); Hideki Nishimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 12/181,958

(22) Filed: Jul. 29, 2008

(65) Prior Publication Data
US 2009/0037018 A1 Feb. 5, 2009

(30) Foreign Application Priority Data
Jul. 31, 2007 (JP) .............................. 2007-199963

(51) Int. Cl.
*B65H 7/02* (2006.01)
(52) U.S. Cl. .................. 271/265.04; 271/262; 271/263
(58) Field of Classification Search ................. 271/262, 271/263, 265.04
See application file for complete search history.

(56) References Cited

U.S. PATENT DOCUMENTS

| 6,040,923 | A * | 3/2000 | Takashimizu et al. ........ 358/498 |
| 6,065,746 | A * | 5/2000 | Tranquilla ................... 271/176 |
| 6,508,465 | B1 * | 1/2003 | Endo ..................... 271/265.01 |
| 7,124,935 | B2 * | 10/2006 | Osawa et al. ................. 235/379 |
| 7,341,178 | B2 * | 3/2008 | Fujikawa ..................... 235/379 |
| 7,384,040 | B2 * | 6/2008 | Tunink et al. ................ 271/262 |
| 7,552,924 | B2 * | 6/2009 | Sano et al. ................... 271/263 |
| 7,651,092 | B2 * | 1/2010 | Hirao et al. .................. 271/298 |
| 7,654,521 | B2 * | 2/2010 | Simonis et al. ............. 271/262 |
| 7,690,650 | B2 * | 4/2010 | Itoh et al. .................... 271/263 |
| 2003/0094748 | A1 * | 5/2003 | Chujo et al. ................. 271/262 |
| 2005/0011722 | A1 * | 1/2005 | Nomura ....................... 194/207 |
| 2005/0127160 | A1 * | 6/2005 | Fujikawa ..................... 235/379 |
| 2005/0184453 | A1 * | 8/2005 | Sano et al. ................... 271/262 |
| 2008/0036139 | A1 * | 2/2008 | Reyner et al. ............... 271/262 |
| 2008/0277863 | A1 * | 11/2008 | Matsutomo et al. ......... 271/109 |
| 2008/0284093 | A1 * | 11/2008 | Itoh et al. .................... 271/262 |
| 2009/0057995 | A1 * | 3/2009 | Murakami et al. .......... 271/262 |

FOREIGN PATENT DOCUMENTS

| JP | 2005-149013 | 6/2005 |
| JP | 2005-225581 | 8/2005 |
| JP | 2005-306491 | 11/2005 |

* cited by examiner

*Primary Examiner*—Stefanos Karmis
*Assistant Examiner*—Prasad V Gokhale

(57) ABSTRACT

A hybrid processing system improves the reliability of multifeed detection even when plural different types of media are processed together without increasing the cost or size of the hybrid processing device due to increased performance, and without incurring a drop in throughput. In addition to image data captured from the processed media by an internal image reader, the hybrid processing device 1 also sends data for confirming multifeeding to the host computer 30. This multifeed confirmation data includes the result from a first multifeed detection process, the result from a second multifeed detection process, the paper length data detected by a paper length detection means 9, and the paper thickness data detected by a paper thickness detection means 65. The host computer 30 uses the image data and the multifeed confirmation data received from the hybrid processing device 1 to independently detect multifeeding, and thereby enables more reliable multifeed detection.

10 Claims, 6 Drawing Sheets

PROCESSING DEVICE, CONTROL METHOD FOR A PROCESSING DEVICE, PROGRAM, PROCESSING SYSTEM AND CONTROL METHOD FOR A PROCESSING SYSTEM

CROSS-REFERENCE TO RELATED APPLICATIONS

Japanese Patent application No. 2007-199963 is hereby incorporated by reference in its entirety.

BACKGROUND

1. Field of Invention

The present invention relates to a processing device, to a control method for a processing device, to a program, to a processing system, and to a control method for a processing system in a system that has a host computer and a processing device that applies prescribed processes in response to commands from the host computer to media conveyed through a media transportation path inside the processing device.

2. Description of Related Art

Technologies for electromagnetically reading checks have been developed in order to improve the efficiency of check processing. Disposed along the paper transportation path through which the checks are conveyed, a check processing device typically has an image reading means (image scanner) that images the conveyed checks, a magnetic ink character reader (MICR reader) that reads information written in magnetic ink on the checks, a communication unit that sends the image data and MICR data captured by these readers to the host computer, and a printing means that prints information such as an endorsement on the back of the processed checks.

When a bank teller receives a check from a customer and passes the check through the processing device, the processing device typically images the check and reads the magnetic ink characters printed on the check in response to read commands from the host computer, and sends the captured image data and magnetic ink character data to the host computer when reading is completed.

A multifeed situation in which two or more checks are conveyed at the same time overlapping each other can also occur in a hybrid processing device that processes checks as they are conveyed.

In order to quickly detect multifed media, Japanese Unexamined Patent Appl. Pub. JP-A-2005-225581 teaches a hybrid processing device that has a paper length detection means and a paper thickness detection means disposed to the media transportation path that conveys the checks. The paper length detection means detects the length of the paper being conveyed, and the paper thickness detection means detects the thickness of the paper. The hybrid processing device also executes a first multifeed detection process that determines multifeeding based on whether the paper length detected by the paper length detection means exceeds a predetermined threshold value, and a second multifeed detection process that detects multifeeding based on whether the paper thickness detected by the paper thickness detection means exceeds a predetermined threshold value.

Demand has also grown for the ability to electromagnetically read information from the forms used for paying utility bills (referred to as "stubs" below) in the same way that checks are read. Because utility bills can also be paid by check, hybrid processing systems that can read both checks and different kinds of stubs are also being developed.

The thickness of such stubs can range from less than the thickness of the checks to more than twice the average check thickness, and stub sizes can range from about the same as a check to much larger or smaller than a check. There are also stubs that are approximately the same size as a check but nearly twice as thick.

FIG. 7 shows when a check 93 is conveyed through the transportation path of the hybrid processing device after a thick stub 91, but multifeeding has occurred and two checks 93 are conveyed together. In this example the length of the thick stub 91 is L1, the length of a check 93 is L2, and there is an offset s between the two multifed checks 93, L1≈L2+s, and the difference between L1 and (L2+s) is within the tolerance range of the detection values output by the paper length detection means of the hybrid processing device.

In this situation the first multifeed detection process of the related art that determines multifeeding based on whether the paper length detected by the paper length detection means exceeds a predetermined threshold value will not detect multifeeding because the multifed checks 93 are considered to be a single form of length L1.

In addition, because the combined thickness of the multifed checks 93 is substantially equal to the thickness of the thick stub 91, the second multifeed detection process of the related art that determines multifeeding based on whether the paper thickness detected by the paper thickness detection means exceeds a predetermined threshold value will not detect multifeeding because the multifed checks 93 are considered to be a single form of a predetermined thickness.

As a result, the hybrid processing device of the related art that detects multifeeding using this first multifeed detection process and this second multifeed detection process may wrongly determine that the two multifed checks 93 are a thick stub 91 and thus fail to detect multifeeding.

SUMMARY OF INVENTION

A processing device and a processing system according to the present invention enable more reliably detecting if multifeeding occurs in processing of multiple different types of forms processed by the processing device.

A first aspect of the invention is a processing device for reading information from media conveyed through a media transportation path according to a command from a host computer, the processing device having: a length detection unit that detects the length of the media; a thickness detection unit that detects the thickness and change in the thickness of the media conveyed through the media transportation path; a multifeed determination unit that detects multifeeding in which a plurality of overlapping media are conveyed together based on the detection results from the length detection unit and the thickness detection unit; and a communication unit that sends multifeed confirmation data including the multifeed determination result output by the multifeed determination unit to the host computer based on a command from the host computer.

The multifeed confirmation data includes the length data detected by the length detection unit, the thickness data detected by the thickness detection unit, and the multifeed determination result output by the multifeed determination unit.

A processing system according to another aspect of the invention has a host computer and a processing device for reading information from media conveyed through a media transportation path according to a command from the host computer. The processing device includes a length detection unit that detects the length of the media, a thickness detection unit that detects the thickness and change in the thickness of the media conveyed through the media transportation path, a multifeed determination unit that detects multifeeding in which a plurality of overlapping media are conveyed together based on the detection results from the length detection unit and the thickness detection unit, and a communication unit that sends multifeed confirmation data including the multifeed determination result output by the multifeed determination unit to the host computer based on a command from the host computer. The host computer detects multifeeding based on the multifeed confirmation data sent from the communication unit.

Further preferably, the processing device has a reading unit that reads information from the media, and sends the data read by the reading unit to the host computer, and the host computer determines multifeeding based on the read data and the multifeed confirmation data.

Another aspect of the invention is a control method for a processing system including a host computer and a processing device for reading information from media conveyed through a media transportation path according to a command from the host computer. The control method has a length detection step that detects the length of the media; a thickness detection step that detects the thickness and change in the thickness of the media conveyed through the media transportation path; a multifeed determination step that detects multifeeding in which a plurality of overlapping media are conveyed together based on the detection results from the length detection unit and the thickness detection unit; and a communication step that sends multifeed confirmation data including the multifeed determination result output by the multifeed determination unit from the processing device to the host computer based on a command from the host computer; and a multifeed confirmation step that detects multifeeding based on the received multifeed confirmation data.

In addition to determining a multifeed condition in which a plurality of overlapping media are conveyed together, the processing device according to the invention also sends data read from the media, the length data, the thickness data, and the multifeed determination result to the host computer. The host computer then separately also determines if there are multifed media by detecting multifeeding based on the received data. This enables detecting multifeeding more reliably than is possible by a processing device according to the related art that only executes the first multifeed detection process and second multifeed detection process described above.

The host computer also uses the data read by the processing device to detect multifeeding. This multifeed confirmation process requires significant processing power and is executed by the host computer. The processing device therefore simply sends the data captured by existing reading means to the host computer, thereby avoiding increasing the processing load on the processing device. A drop in the throughput of the processing device caused by an increased processor load can therefore be prevented.

Because the processing load of the processing device does not increase significantly, increasing performance to increase the processing capacity of the processing device is not necessary, and cost and size increases incurred by improving the performance of the processing device can be prevented.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a hybrid processing system according to the present invention is described below with reference to the accompanying figures.

Figure 1:
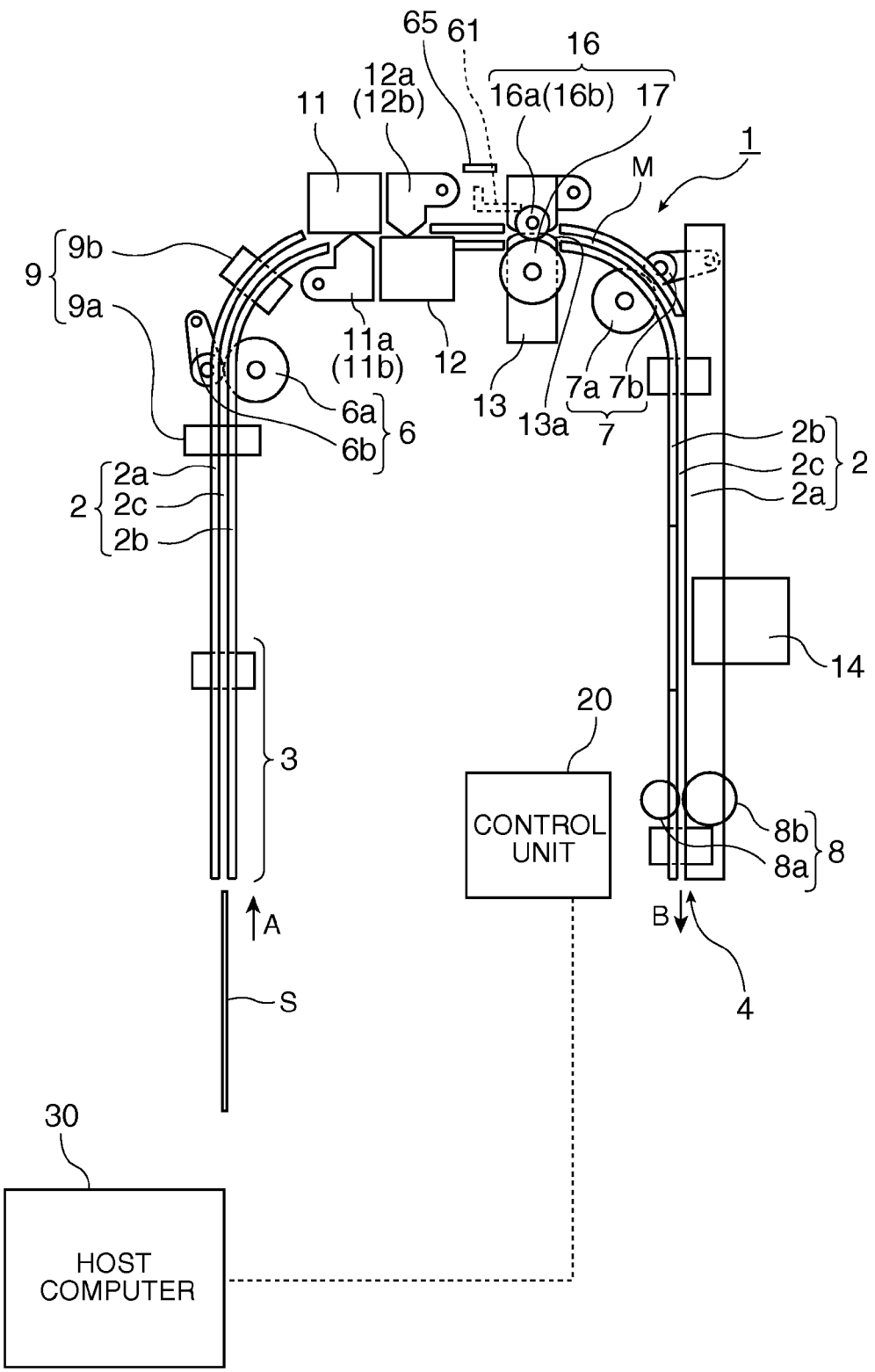
FIG. 1 is a schematic diagram of the paper transportation path in a hybrid processing device used in a hybrid processing system according to a preferred embodiment of the invention.
Figure 2:
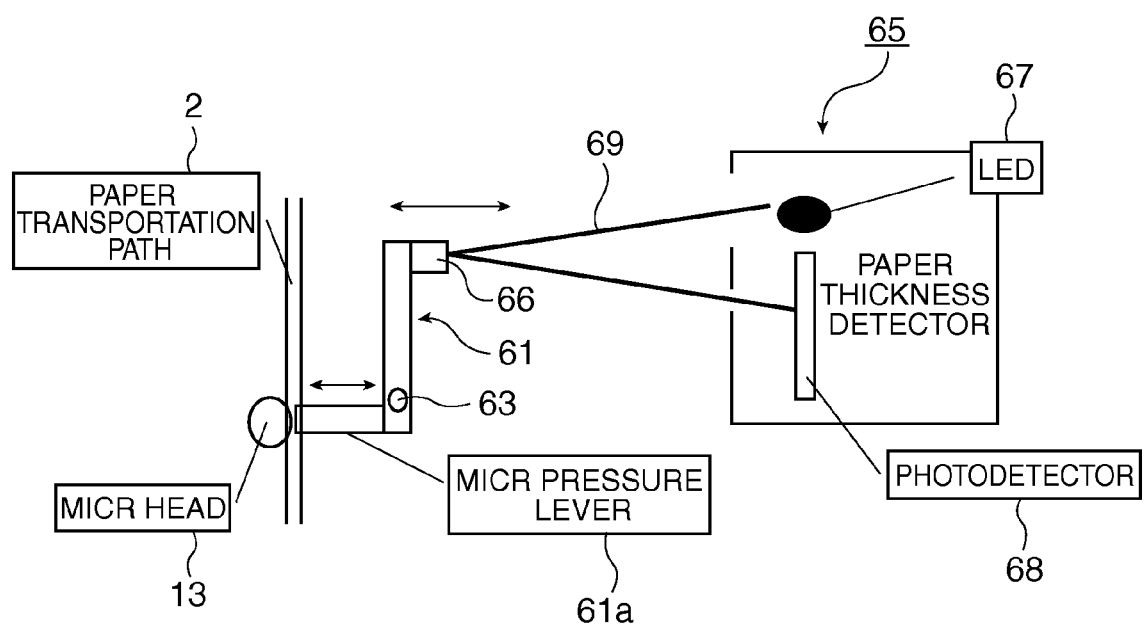
FIG. 2 is a schematic diagram showing the paper thickness detection means disposed to the paper transportation path of the hybrid processing device shown in FIG. 1.
Figure 3:
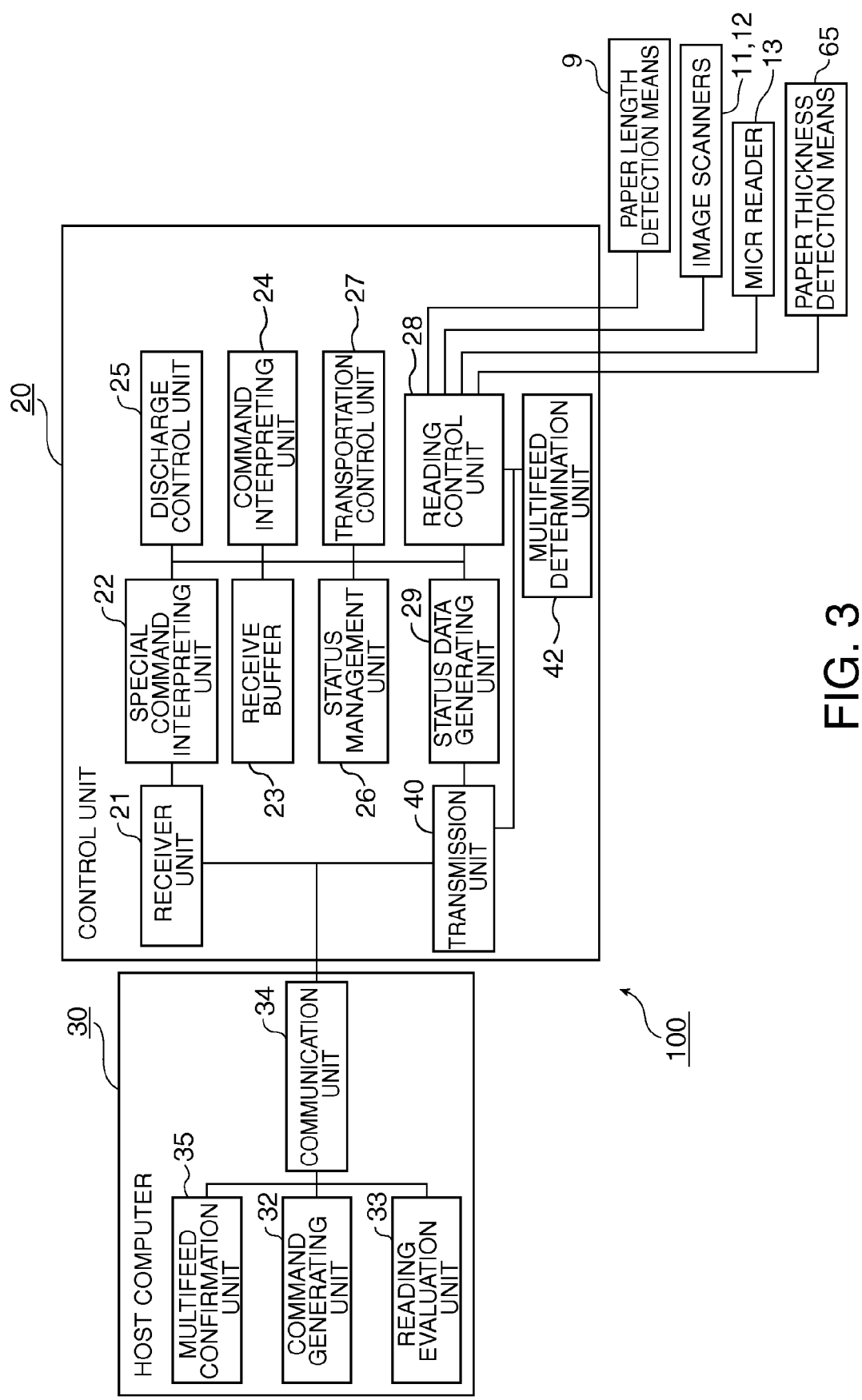
FIG. 3 is a function block diagram of the hybrid processing system shown in FIG. 1.
Figure 4:
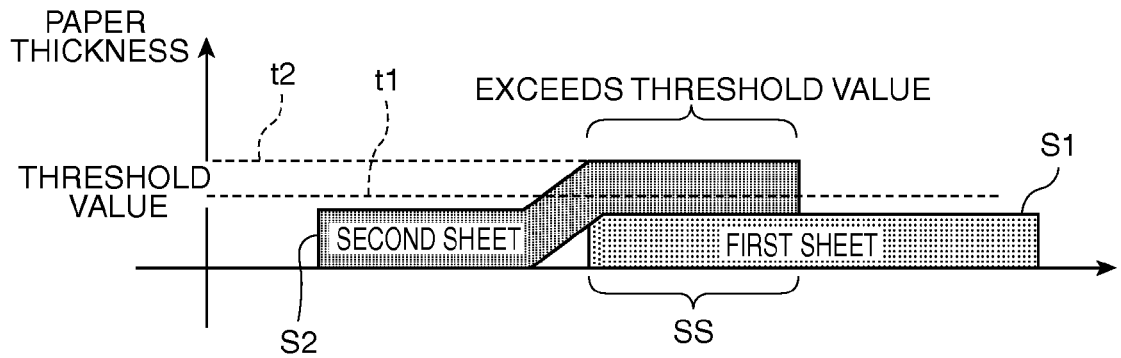
FIG. 4 shows a second multifeed detection process executed by the hybrid processing device shown in FIG. 1.
Figure 5:
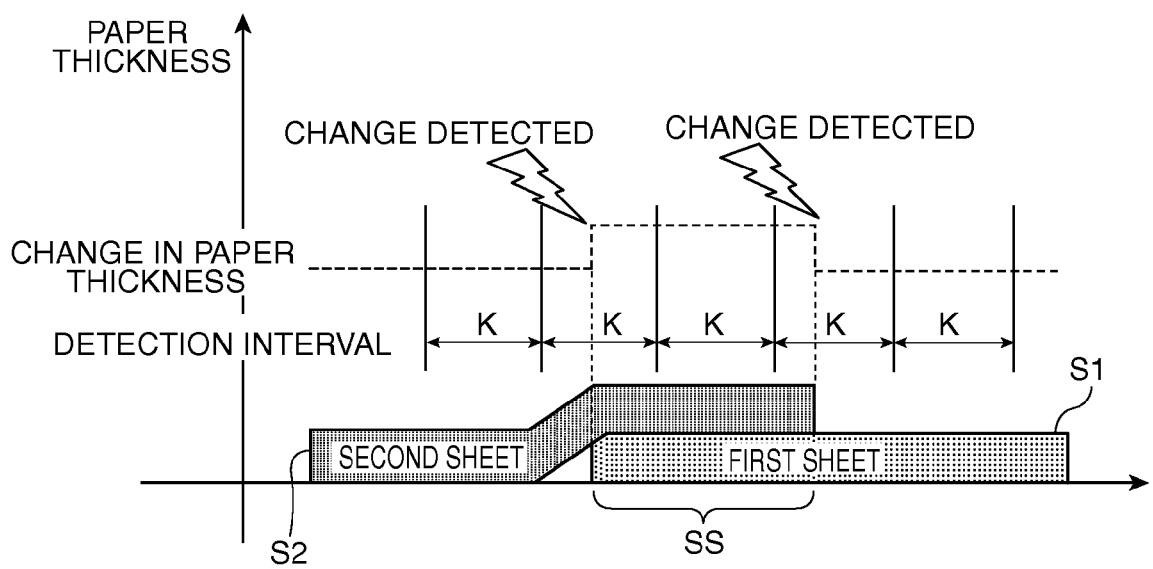
FIG. 5 shows a third multifeed detection process executed by the hybrid processing device shown in FIG. 1.
Figure 6:
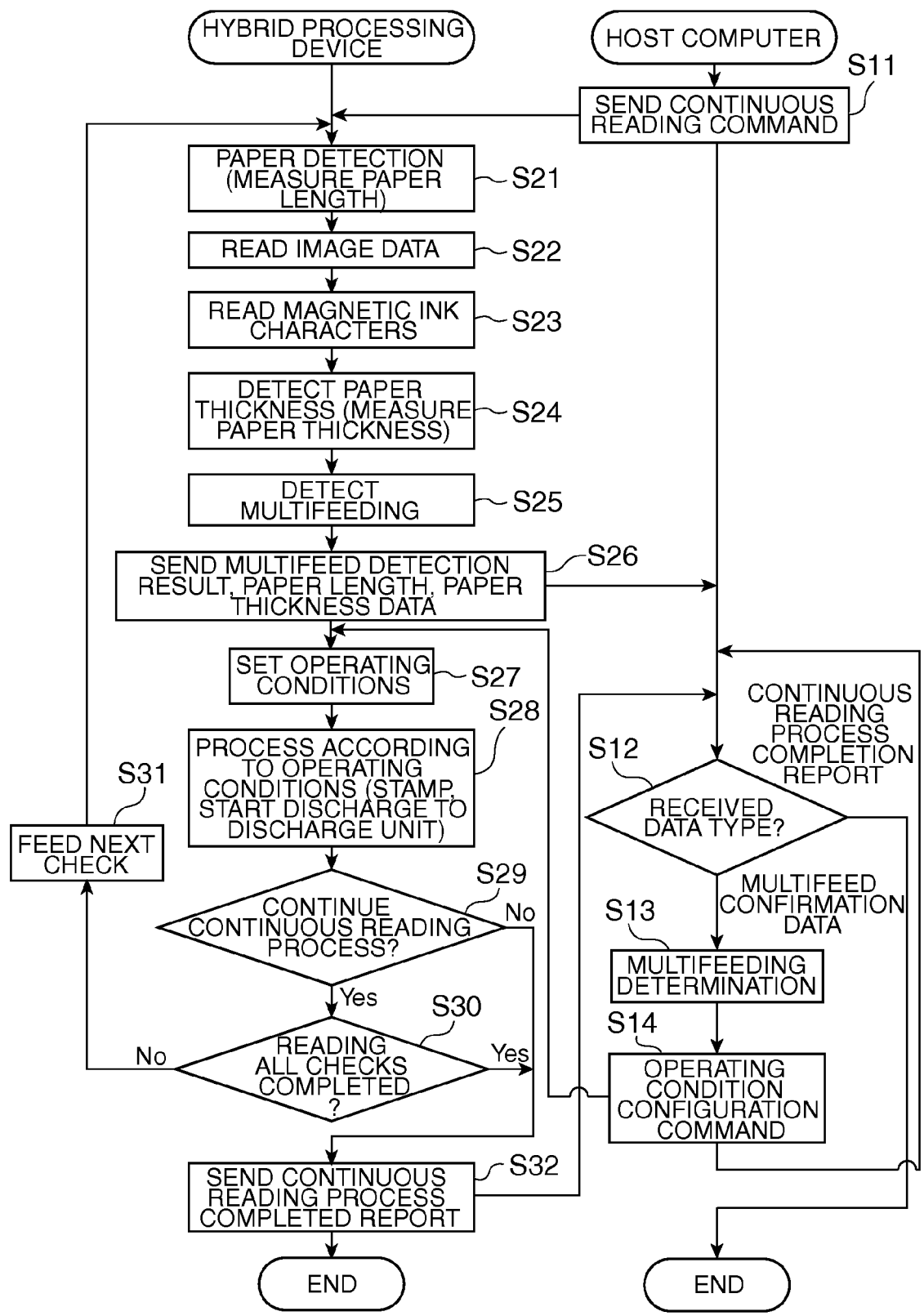
FIG. 6 is a flow chart showing the operations in the form reading processes of the hybrid processing system shown in FIG. 1.

FIG. 1 is a schematic diagram of the paper transportation path in a hybrid processing device used in a hybrid processing system according to a preferred embodiment of the invention. FIG. 2 is a schematic diagram showing the paper thickness detection means disposed to the paper transportation path of the hybrid processing device shown in FIG. 1. FIG. 3 is a function block diagram of the hybrid processing system shown in FIG. 1. FIG. 4 shows a second multifeed detection process executed by the hybrid processing device shown in FIG. 1. FIG. 5 shows a third multifeed detection process executed by the hybrid processing device shown in FIG. 1. FIG. 6 is a flow chart describing operation in the form reading processes of the hybrid processing system shown in FIG. 1.

The hybrid processing system 100 according to the present invention includes a host computer 30 and a hybrid processing device 1. The hybrid processing device 1 applies prescribed processes according to commands received from the host computer 30 to check 93, stubs 91, and other forms conveyed through the paper transportation path 2 of the hybrid processing device 1.

The hybrid processing device 1 is a terminal device that is used at a teller window, for example, where sheet media S (media) such as checks 93 and stubs 91 are processed, and images both sides of the sheet media S and reads magnetic ink characters from the sheet media S while conveying the sheet media S that are loaded into an automatic sheet feeder (ASF) 3 disposed as a paper supply unit through a paper transportation path 2 (media transportation path).

The sheet media S transportation path 2 is substantially U-shaped, and has a middle transportation path M in the portion corresponding to the bottom of the U. Various reading devices are disposed to this middle transportation path M.

The paper transportation path 2 includes a conveyance portion 2c between an outside guide 2a and an inside guide 2b, and the sheet media S are conveyed along this conveyance portion 2c.

An automatic sheet feeder 3 that holds multiple sheet media S is disposed to the upstream end of the paper transportation path 2. The plural sheet media S are inserted in the direction of arrow A by the automatic sheet feeder 3 to the paper transportation path 2. The plural sheet media S loaded in the automatic sheet feeder 3 are separated and fed one at a time into the paper transportation path 2.

Disposed as a transportation means for conveying the checks S through the paper transportation path 2 are a first paper transportation roller pair 6 on the upstream side of the middle transportation path M, a middle transportation roller set 16 disposed in the middle of the middle transportation path M, a second transportation roller pair 7 on the downstream side of the middle transportation path M, and a discharge roller pair 8 located before the exit 4.

The paper transportation roller pair 6 includes a drive roller 6a and a pressure roller 6b located on the other side of the paper transportation path 2 opposite the drive roller 6a.

The second transportation roller pair 7 includes a drive roller 7a and a pressure roller 7b located on the other side of the paper transportation path 2 opposite the drive roller 7a.

The middle transportation roller set 16 includes a lower pressure roller 16a disposed to the lower part of the paper transportation path 2, an upper pressure roller 16b disposed above the lower pressure roller 16a, and a drive roller 17 located on the other side of the middle transportation path M opposite the lower pressure roller 16a and upper pressure roller 16b.

Sheet media S that are fed from the automatic sheet feeder 3 into the paper transportation path 2 are conveyed by the first paper transportation roller pair 6, the middle transportation roller set 16, and the second transportation roller pair 7 through the middle transportation path M, and are then discharged in the direction of arrow B by the discharge rollers 8.

A trailing end detection sensor 9a and a leading end detection sensor 9b are disposed to the paper transportation path 2 before and after the first paper transportation roller pair 6. The trailing end detection sensor 9a and leading end detection sensor 9b render a paper length detection means 9 (length detection unit) that measures the length of the conveyed media.

These sensors 9a and 9b detect passage of the trailing end and leading end of the sheet media S. In addition to detecting by means of these sensors 9a and 9b that sheet media S has been conveyed thereto, the paper length detection means 9 detects the length of the sheet media S from the time that the corresponding ends of the sheet media passed and the distance between the sensors 9a and 9b.

A first image scanner 11 and a second image scanner 12 for imaging both sides of the sheet media S are disposed on opposite sides of the middle transportation path M at offset positions in the paper transportation direction.

The first and second image scanners 11 and 12 are CIS (contact image sensor) type scanners. The image scanners 11 and 12 each emit light to one side of each sheet medium S conveyed through the middle transportation path M, sense the light reflected from the media using a plurality of photosensors (photoelectric conversion elements), convert the light to electric signals, and capture one line of the complete image. In this embodiment of the invention the first image scanner 11 images the back of each sheet medium S and the second image scanner 12 images the front of each sheet medium S one line at a time to acquire a two-dimensional image of the sheet medium S.

The MICR (magnetic ink character recognition) reader 13 for reading information (such as magnetic ink characters) recorded using magnetic ink on the sheet media S is located below the drive roller 17. The MICR reader 13 reads the magnetic ink characters with the sheet medium S pressed against the surface of the MICR reader 13 by means of a pressure lever 61 disposed on the other side of the middle transportation path M opposite the MICR reader 13.

As shown in FIG. 2, the pressure lever 61 is a crank lever supported so that it can pivot on a pivot point 63. The distal end part 61a opposite the MICR reader 13 is urged by an urging means not shown to press the sheet media S against the MICR reader 13.

The pressure lever 61 is a part of the paper thickness detection means 65 (thickness detection unit) that detects the thickness of the sheet media S pressed to the MICR reader 13.

The paper thickness detection means 65 includes a reflector 66 formed on the back end surface of the pressure lever 61, a light-emitting element (LED) 67 that emits a detection beam 69 to the reflector 66 from a position separated from the reflector 66, and a photodetector 68 that detects the light reflected by the reflector 66. The pressure lever 61 pivots according to the thickness of the sheet media S located between the MICR reader 13 and the pressure lever 61. Movement of the pressure lever 61 causes the position where the detection beam 69 reflected from the reflector 66 is incident to the photodetector 68 to change, thereby enabling the paper thickness detection means 65 to detect the thickness of the sheet media S.

A stamping mechanism 14 is disposed to the paper transportation path 2 between the second transportation roller pair 7 and the discharge roller pair 8. If reading the check is successfully completed, the stamping mechanism 14 stamps ELECTRONIC FUNDS TRANSFER or similar content indicating that the check was processed electronically on the face of the check S, for example. The stamping mechanism 14 stamps the front or back of the check S just before it is discharged into a discharge tray not shown. When the check S is imaged and the magnetic ink characters are read by the respective readers, the stamping mechanism 14 applies a stamp indicating that the check was successfully processed electronically.

Operation of the various parts of the hybrid processing device 1 described above is controlled by a control unit 20 disposed in the hybrid processing device 1. The control unit 20 interprets commands sent from the host computer 30 and executes the processes corresponding to the commands from the host computer 30 based on firmware that is preinstalled in an internal program recording unit.

\* Internal Processing by the Hybrid Processing Device

The internal processes of the hybrid processing device 1 are described next with reference to FIG. 3.

The control unit 20 of the hybrid processing device 1 includes a receiver unit 21, a special command interpreting unit 22, a receive buffer 23, a command interpreting unit 24, a discharge control unit 25, a status management unit 26, a transportation control unit 27, a reading control unit 28, a status data generating unit 29, a transmission unit 40, and a multifeed determination unit 42.

The status management unit 26 centrally controls the overall operation of the control unit 20. The status management unit 26 monitors the other units, and the status data generating unit 29 generates status data if there is a change in status. The status data includes, for example, a start feeding report, a reading completed report, and a discharge completed report. The output status reports are sent through the transmission unit 40 to the host computer 30.

The receiver unit 21 is an interface for receiving data sent from the host computer 30. If the data received by the receiver unit 21 is a special command, the command is interpreted by the special command interpreting unit 22, and if the received data is not a special command, the data is temporarily stored in the receive buffer 23. The command interpreting unit 24 sequentially reads and interprets the data stored in the receive buffer 23, and the status management unit 26 issues instructions to the control units according to the interpreted command.

If the command interpreting unit 24 determines that the received data is a continuous read command, the status management unit 26 issues instructions to the transportation control unit 27 and reading control unit 28 to apply the continuous reading process to the checks S. More specifically, commands for imaging the front and back of the checks S and reading the MICR line of each check are asserted.

Based on the operating condition configuration command sent from the host computer 30, the discharge control unit 25 sets the discharge process for each check S in the continuous reading process.

The reading control unit 28 reads information by means of the paper length detection means 9, the image scanners 11 and 12, the MICR reader 13, and the paper thickness detection means 65. The image data from the sheet media S captured by the image scanners 11 and 12, and the magnetic ink character data read by the MICR reader 13 is sent through the transmission unit 40 to the host computer 30.

The paper length of the sheet media S detected by the paper length detection means 9 and the paper thickness detected by the paper thickness detection means 65 are sent together with the result from the multifeed determination unit 42 as the data for confirming multifeeding ("multifeed confirmation data" below) by the transmission unit 40 to the host computer 30.

The multifeed determination unit 42 determines if a plurality of sheet media S are conveyed overlapping each other (a multifeed state) through the paper transportation path 2. This multifeed determination is based on a first multifeed detection process, a second multifeed detection process, and a third multifeed detection process.

More specifically, the first multifeed detection process determines multifeeding based on whether the paper length detected by the paper length detection means 9 disposed to the paper transportation path 2 exceeds a predetermined threshold value.

The second multifeed detection process determines multifeeding based on whether the paper thickness detected by the paper thickness detection means 65 disposed to the paper transportation path 2 exceeds a predetermined threshold value.

The third multifeed detection process determines multifeeding by detecting the length of the area in which the paper thickness varies based on the output values of the paper thickness detection means 65, and then determining if the length of this variable thickness area exceeds a predetermined threshold value.

If a first sheet medium S1 and a second sheet medium S2 are conveyed overlapping as shown in FIG. 4, and the thickness t2 detected by the paper thickness detection means 65 at the overlapping portion SS of the media exceeds a threshold value t1, the second multifeed detection process detects a media multifeed condition.

As shown in FIG. 5, the third multifeed detection process checks the thickness detected by the paper thickness detection means 65 every feed length k of the sheet media S. If a first sheet medium S1 and a second sheet medium S2 are fed overlapping, the third multifeed detection process detects the length of the overlapping portion SS from the change in the output values of the paper thickness detection means 65, and determines a media multifeed condition if the length of this overlapping portion SS exceeds a predetermined threshold value.

The multifeed determination unit 42 sends the results of the first to third multifeed detection processes (the multifeed determination results), the paper length data (length data) previously detected by the paper length detection means 9, and the paper thickness data (thickness data) detected by the paper thickness detection means 65 to the host computer 30 as the data for multifeed confirmation (referred to below as the "multifeed confirmation data").

* Internal Processing by the Host Computer

Internal processing by the host computer 30 is described next. As shown in FIG. 3, the host computer 30 has a command generating unit 32, a reading evaluation unit 33, a communication unit 34, and a multifeed confirmation unit 35.

The command generating unit 32 generates commands causing the control unit 20 to execute various operations. One such command is a continuous read command for conveying a plurality of sheet media S loaded in the automatic sheet feeder 3 through the transportation path, imaging the checks S by means of the first and second image scanners 11 and 12, and reading the magnetic ink characters by means of the MICR reader 13. The command generating unit 32 also generates operating condition configuration commands that set the discharge process in the continuous reading process according to the result of reading individual sheet media S.

The reading evaluation unit 33 recognizes the read information received from the control unit 20. More specifically, the reading evaluation unit 33 determines the quality (CAR/LAR, IQA, for example) of the image data captured by the image scanners 11 and 12, executes an optical character recognition (OCR) process, and applies a MICR process to the data read by the MICR reader 13.

The communication unit 34 is an interface for communicating with the control unit 20. The communication unit 34 outputs commands generated by the command generating unit 32, and receives the read information sent from the control unit 20.

The multifeed confirmation unit 35 confirms the multifeed determination based on the multifeed confirmation data and the image data of the sheet media S sent from the control unit 20.

* Multifeed Confirmation Process

The multifeed confirmation process of the hybrid processing system 100 described above is described next with reference to FIG. 6. The steps of the hybrid processing device 1 are executed by running firmware prerecorded in the program recording unit of the control unit 20 disposed in the hybrid processing device 1.

After selecting whether to apply the multifeed confirmation process to the sheet media S and asserting a continuous read command to process the sheet media S, the command generating unit 32 of the host computer 30 generates and sends a continuous check read command to the control unit 20 of the hybrid processing device 1 (step S11). This continuous read command contains the instruction determining whether to run the multifeed confirmation process. This embodiment assumes that the continuous read command contains an instruction to execute the multifeed confirmation process.

If the command interpreting unit 24 of the hybrid processing device 1 determines that the received command is a continuous read command, the status management unit 26 instructs the transportation control unit 27 to convey a single sheet medium S. When the first sheet medium S is conveyed, the status data generating unit 29 sends a start feeding status report through the transmission unit 40 to the host computer 30.

The paper length detection means 9 then detects the paper length of the sheet media S fed through the paper transportation path 2 (step S21). The first and second image scanners 11 and 12 then image the sheet media S (step S22), and the MICR reader 13 reads the magnetic ink characters from the sheet media S (step S23). the paper thickness detection means 65 disposed opposite the MICR reader 13 also detects the thickness of the sheet media S and detects variation in the paper thickness (step S24).

When the paper length detection, imaging process, MICR process, paper thickness detection, and paper thickness variation detection are completed, the multifeed determination unit 42 determines if plural sheet media are being fed together (step S25).

This multifeed determination involves the three multifeed detection processes described below.

(1) The first multifeed detection process determines multifeeding based on whether the paper length detected by the paper length detection means 9 disposed to the paper transportation path 2 exceeds a predetermined threshold value.

(2) The second multifeed detection process determines multifeeding based on whether the paper thickness t2 detected by the paper thickness detection means 65 disposed to the paper transportation path 2 exceeds a predetermined threshold value t1.

(3) The third multifeed detection process determines multifeeding by detecting the length of the area in which the paper thickness varies based on the output values of the paper thickness detection means 65, and then determining if the length of this variable thickness area exceeds a predetermined threshold value.

When these three multifeed detection processes end, the result of each multifeed detection process, the paper length detected in step S21, and the paper thickness detected in step S24 are sent through the transmission unit 40 to the host computer 30 as the multifeed confirmation data (step S26).

After sending the multifeed confirmation data, the hybrid processing device 1 pauses operation until the operating condition configuration command is received from the host computer 30.

After the host computer 30 receives the multifeed confirmation data, the reading evaluation unit 33 determines the type of received data (step S12). If the multifeed confirmation data is detected, the multifeed confirmation unit 35 detects multifeeding using the previously received image data for the sheet media S (step S13).

The command generating unit 32 generates an operating condition configuration command reflecting the multifeed determination result of the multifeed confirmation unit 35, and sends the generated operating condition configuration command to the hybrid processing device 1 by means of the communication unit 34 (step S14).

If the command interpreting unit 24 of the hybrid processing device 1, which paused operation after completing step S26, detects the operating condition configuration command in the data sent from the host computer 30, the discharge control unit 25 sets the operating conditions accordingly (step S27). The hybrid processing device 1 is thus set to the operating conditions set by the host computer 30 based on the multifeed confirmation result.

If the operating conditions set in step S27 are set to apply the stamp indicating the sheet medium was processed electronically, the stamping mechanism 14 applies the stamp to the surface of the check S which is then discharged to the discharge unit (step S28). If the discharge unit has a plurality of discharge paths, checks S can be discharged and sorted based on the multifeed confirmation result by setting the discharge path with the operating condition configuration command.

When discharging the first check S ends, the hybrid processing device 1 sends a discharge completed status report to the host computer 30.

If the continuous reading process is set to continue (step S29 returns Yes), and a next check S is in the automatic sheet feeder 3 or the paper transportation path 2, the continuous processing routine of steps S29 to S31 causes steps S21 to S28 to repeat.

When processing all of the sheet media loaded in the automatic sheet feeder 3 of the hybrid processing device 1 is completed (step S30 returns Yes), a continuous reading process completion report is sent through the transmission unit 40 to the host computer 30 and processing ends (step S32).

If in step S29 the operating conditions set in step S27 are not configured to repeat the continuous reading process, the continuous reading process completion report is sent through the transmission unit 40 to the host computer 30 and the continuous reading process ends (step S32).

When the host computer 30 detects the continuous reading process completion report in the data sent from the hybrid processing device 1 (step S12), the host computer 30 ends the continuous reading process for the checks S.

In the hybrid processing system 100 according to the present invention described above, the hybrid processing device 1 executes a third multifeed detection process in addition to the first multifeed detection process and second multifeed detection process, and can therefore detect multifeeding more reliably than the related art.

In addition, the host computer 30 that receives the image data for the sheet media S being processed and the multifeed confirmation data from the hybrid processing device 1 in the hybrid processing system 100 according to the present invention executes an additional multifeed determination process by detecting multifeeding with high precision by applying an image recognition process based on the data received from the hybrid processing device 1. This enables the host computer 30 to detect multifeeding even when the multifeeding cannot be detected on the hybrid processing device 1 side by means of the first multifeed detection process, second multifeed detection process, and third multifeed detection process, and thus further improves the accuracy of multifeed detection.

Figure 7:
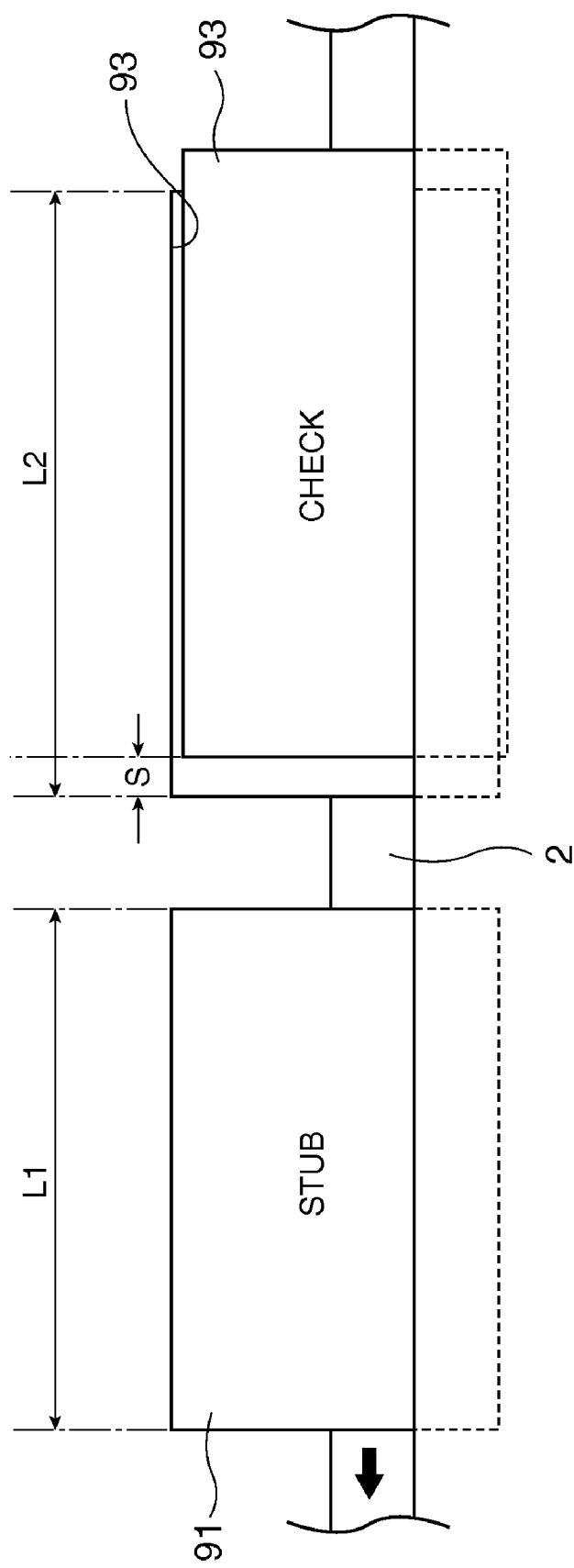
FIG. 7 shows a multifeed situation that is difficult to detect using only the multifeed detection processes executed by the hybrid processing device shown in FIG. 1.

For example, when a thick stub 91 and checks 93 are mixed together and processed continuously, thin checks 93 are fed overlapping as shown in FIG. 7, and the first multifeed detection process, second multifeed detection process, and third multifeed detection process of the hybrid processing device 1 cannot detect multifeeding, the multifeed confirmation process of the host computer 30 can reliably detect that the checks are being fed together in a multifeed state.

Furthermore, because the multifeed detection process that relies on an image recognition process requiring substantial processing power is executed by the host computer 30, the hybrid processing device 1 simply sends the data that is captured by the existing reading means to the host computer 30. A substantial processing load is therefore not applied to the hybrid processing device 1. A drop in throughput caused by an increased processing load on the hybrid processing device 1 can therefore be prevented.

Because the processing load of the hybrid processing device 1 does not increase significantly, increasing performance to increase the processing capacity of the hybrid processing device 1 is not necessary, and cost and size increases incurred by improving the performance of the hybrid processing device 1 can be prevented.

In addition, the hybrid processing device 1 according to this embodiment of the invention has a third multifeed detection process for detecting multifeeding by detecting the length of the area in which the paper thickness varies based on the output values of the paper thickness detection means 65, and then determining if the length of this variable thickness area exceeds a predetermined threshold value. This third multifeed detection process can therefore eliminate a change in paper thickness caused by the leading end of the paper being folded over, for example, from being considered a multifeed condition, and can therefore improve the accuracy of multifeed detection by the hybrid processing device 1.

Furthermore, the third multifeed detection process detects the area of variable paper thickness using the detector values output by the existing paper thickness detection means 65 that is used in the second multifeed detection process. The third multifeed detection process therefore does not require any additional special hardware, does not incur a cost increase caused by additional hardware, and can therefore improve the accuracy of multifeed detection by the hybrid processing device 1.

It shall be noted that the methods of the present invention may be performed by a computer executing a program, the program being stored on a computer-readable medium. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A processing device for reading information from media conveyed through a media transportation path according to a command from a host computer, comprising:
 a length detection unit that detects the length of the media;
 a thickness detection unit that detects the thickness and change in the thickness of the media conveyed through the media transportation path;
 a multifeed determination unit that detects multifeeding in which a plurality of overlapping media are conveyed together based on the detection results from the length detection unit and the thickness detection unit; and
 a communication unit that sends multifeed confirmation data including the multifeed determination result output by the multifeed determination unit to the host computer based on a command from the host computer;
 wherein the detection results include
  the result of detecting if the media length detected by the length detection unit exceeds a first predetermined threshold value,
  the result of detecting if the media thickness detected by the thickness detection unit exceeds a second predetermined threshold value, and
  the result of detecting if the change in the thickness of the media detected by the thickness detection unit exceeds a third predetermined threshold value.

2. The processing device described in claim 1, wherein:
 the multifeed confirmation data includes the length data detected by the length detection unit, the thickness data detected by the thickness detection unit, and the multifeed determination result output by the multifeed determination unit.

3. The processing device described in claim 1, wherein:
 the multifeed determination result is the result of detecting multifeeding based on the detection results.

4. A control method for a processing device that reads information from media conveyed through a media transportation path according to a command from a host computer, comprising:
 a length detection step that detects, using a length detection unit, the length of the media;
 a thickness detection step that detects, using a thickness detection unit, the thickness and change in the thickness of the media conveyed through the media transportation path;
 a multifeed determination step that detects, using a multifeed determination unit, multifeeding in which a plurality of overlapping media are conveyed together based on the detection results from the length detection step and the thickness detection step; and
 a communication step that sends, using a communication unit, multifeed confirmation data including the multifeed determination result output by the multifeed determination step to the host computer based on a command from the host computer;
 wherein the detection results include
  the result of detecting if the detected media length exceeds a first predetermined threshold value,
  the result of detecting if the detected media thickness exceeds a second predetermined threshold value, and
  the result of detecting if the detected change in the thickness of the media exceeds a third predetermined threshold value.

5. A non-transitory computer-readable medium for storing a program executable by a computer to perform a control method for reading information from media conveyed through a media transportation path according to a command from a host computer, the program comprising:
 instructions for detecting the length of the media;
 instructions for detecting the thickness and change in the thickness of the media conveyed through the media transportation path;
 instructions for detecting multifeeding in which a plurality of overlapping media are conveyed together based on the results of the length detecting and thickness detecting; and
 instructions for sending multifeed confirmation data including the multifeed detecting result to the host computer based on a command from the host computer;
 wherein the detection results include
  the result of detecting if the detected media length exceeds a first predetermined threshold value,
  the result of detecting if the detected media thickness exceeds a second predetermined threshold value, and
  the result of detecting if the detected change in the thickness of the media exceeds a third predetermined threshold value.

6. A processing system comprising:

a host computer; and a processing device for reading information from media conveyed through a media transportation path according to a command from the host computer, wherein the processing device includes
- a length detection unit that detects the length of the media,
- a thickness detection unit that detects the thickness and change in the thickness of the media conveyed through the media transportation path,
- a multifeed determination unit that detects multifeeding in which a plurality of overlapping media are conveyed together based on the detection results from the length detection unit and the thickness detection unit, and
- a communication unit that sends multifeed confirmation data including the multifeed determination result output by the multifeed determination unit to the host computer based on a command from the host computer; and the host computer detects multifeeding based on the multifeed confirmation data sent from the communication unit;

wherein the detection results include
- the result of detecting if the media length detected by the length detection unit exceeds a first predetermined threshold value,
- the result of detecting if the media thickness detected by the thickness detection unit exceeds a second predetermined threshold value, and
- the result of detecting if the change in the thickness of the media detected by the thickness detection unit exceeds a third predetermined threshold value.

7. The processing system described in claim 6, wherein:

the processing device has a reading unit that reads information from the media, and sends the data read by the reading unit to the host computer; and the host computer determines multifeeding based on the read data and the multifeed confirmation data.

8. The processing system described in claim 7, wherein:

the read data is image data.

9. A control method for a processing system including a host computer and a processing device for reading information from media conveyed through a media transportation path according to a command from the host computer, wherein the control method comprises:
- a length detection step that detects, using a length detection unit, the length of the media;
- a thickness detection step that detects, using a thickness detection unit, the thickness and change in the thickness of the media conveyed through the media transportation path;
- a multifeed determination step that detects, using a multifeed determination unit, multifeeding in which a plurality of overlapping media are conveyed together based on the detection results from the length detection step and the thickness detection step; and
- a communication step that sends, using a communication unit, multifeed confirmation data including the multifeed determination result output by the multifeed determination unit from the processing device to the host computer based on a command from the host computer; and
- a multifeed confirmation step that detects, using a multifeed confirmation unit, multifeeding based on the received multifeed confirmation data;

wherein the detection results include
- the result of detecting if the detected media length exceeds a first predetermined threshold value,
- the result of detecting if the detected media thickness exceeds a second predetermined threshold value, and
- the result of detecting if the detected change in the thickness of the media exceeds a third predetermined threshold value.

10. The control method for a processing system described in claim 9, further comprising:

a reading step that reads information from the media;

wherein the multifeed confirmation step determines multifeeding based on data read by the reading step and the multifeed confirmation data.

* * * * *